United States Patent
Rappaport et al.

(10) Patent No.: US 11,149,841 B2
(45) Date of Patent: Oct. 19, 2021

(54) PLANET CARRIER FOR AN EPICYCLIC SPEED REDUCTION GEAR

(71) Applicant: SAFRAN TRANSMISSION SYSTEMS, Colombes (FR)

(72) Inventors: Florian Rappaport, Moissy-Cramayel (FR); Jean-Charles Michel Pierre Di Giovanni, Moissy-Cramayel (FR); Alexis Claude Michel Dombek, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/957,442

(22) PCT Filed: Dec. 28, 2018

(86) PCT No.: PCT/FR2018/053563
§ 371 (c)(1),
(2) Date: Jun. 24, 2020

(87) PCT Pub. No.: WO2019/130006
PCT Pub. Date: Jul. 4, 2019

(65) Prior Publication Data
US 2021/0062911 A1    Mar. 4, 2021

(30) Foreign Application Priority Data

Dec. 29, 2017  (FR) ........................... 1763349

(51) Int. Cl.
*F16H 57/08* (2006.01)
*F16H 57/04* (2010.01)

(52) U.S. Cl.
CPC ....... *F16H 57/082* (2013.01); *F16H 57/0479* (2013.01); *F05D 2220/323* (2013.01); *F05D 2260/40311* (2013.01)

(58) Field of Classification Search
CPC .............. F16H 57/0479; F16H 57/082; F05D 2220/323; F05D 2260/40311
See application file for complete search history.

(56) References Cited

U.S. PATENT DOCUMENTS

2005/0192152 A1   9/2005  Kimes
2006/0252596 A1*  11/2006  Abarquez ............. F16H 57/082
                                                    475/331

(Continued)

FOREIGN PATENT DOCUMENTS

| CN | 201747802 U | 2/2011 |
| EP | 1186804 A1  | 3/2002 |
| EP | 2677209 A1  | 12/2013 |

OTHER PUBLICATIONS

International Search Report dated Apr. 30, 2019, issued in corresponding International Application No. PCT/FR2018/053563, filed Dec. 28, 2018, 2 pages.

(Continued)

*Primary Examiner* — Justin Holmes
(74) *Attorney, Agent, or Firm* — Christensen O'Connor Johnson Kindness PLLC

(57) ABSTRACT

A planet carrier for an epicyclic speed reduction gear, comprising a torque transmission member of longitudinal axis A and an annular cage extending around the axis A and connected to a longitudinal end of the member, said cage comprising two flanks extending essentially radially with respect to the axis A and connected by bridges, seats extending axially between the flanks and being intended for supporting planet gears mounted rotatably about the seats, characterized in that said bridges comprise bars which cross one another essentially in the shape of an X, and of which the ends located on the side of said member are connected (Continued)

to said member by a ring extending around said axis A and comprising a continuous internal annular channel.

20 Claims, 4 Drawing Sheets

(56) References Cited

U.S. PATENT DOCUMENTS

| | | | |
|---|---|---|---|
| 2006/0293142 A1* | 12/2006 | Torres | F16C 25/06 475/331 |
| 2009/0029820 A1* | 1/2009 | Nishida | F16D 25/123 475/159 |
| 2013/0337967 A1 | 12/2013 | Kleine-Brockhoff et al. | |
| 2016/0377165 A1* | 12/2016 | Sheridan | F16H 57/082 60/226.1 |
| 2017/0016528 A1 | 1/2017 | Miyoshi et al. | |

OTHER PUBLICATIONS

Written Opinion of the International Searching Authority dated Apr. 30, 2019, issued in corresponding International Application No. PCT/FR2018/053563, filed Dec. 28, 2018, 7 pages.

Written Opinion of the International Searching Authority dated Apr. 30, 2019, issued in corresponding International Application No. PCT/FR2018/053563, filed Dec. 28, 2018, 8 pages.

International Preliminary Report on Patentability dated Jun. 30, 2020, issued in corresponding International Application No. PCT/FR2018/053563, filed Dec. 28, 2018, 1 page.

* cited by examiner

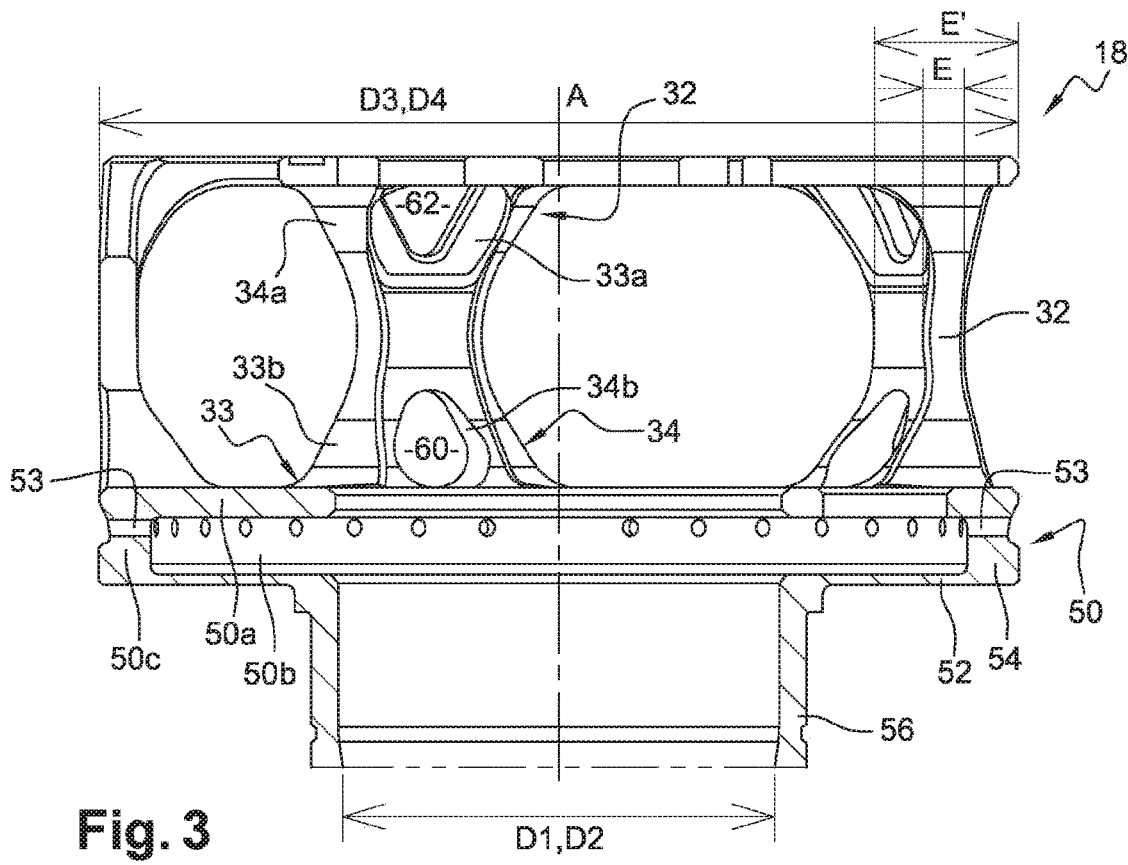
Fig. 3
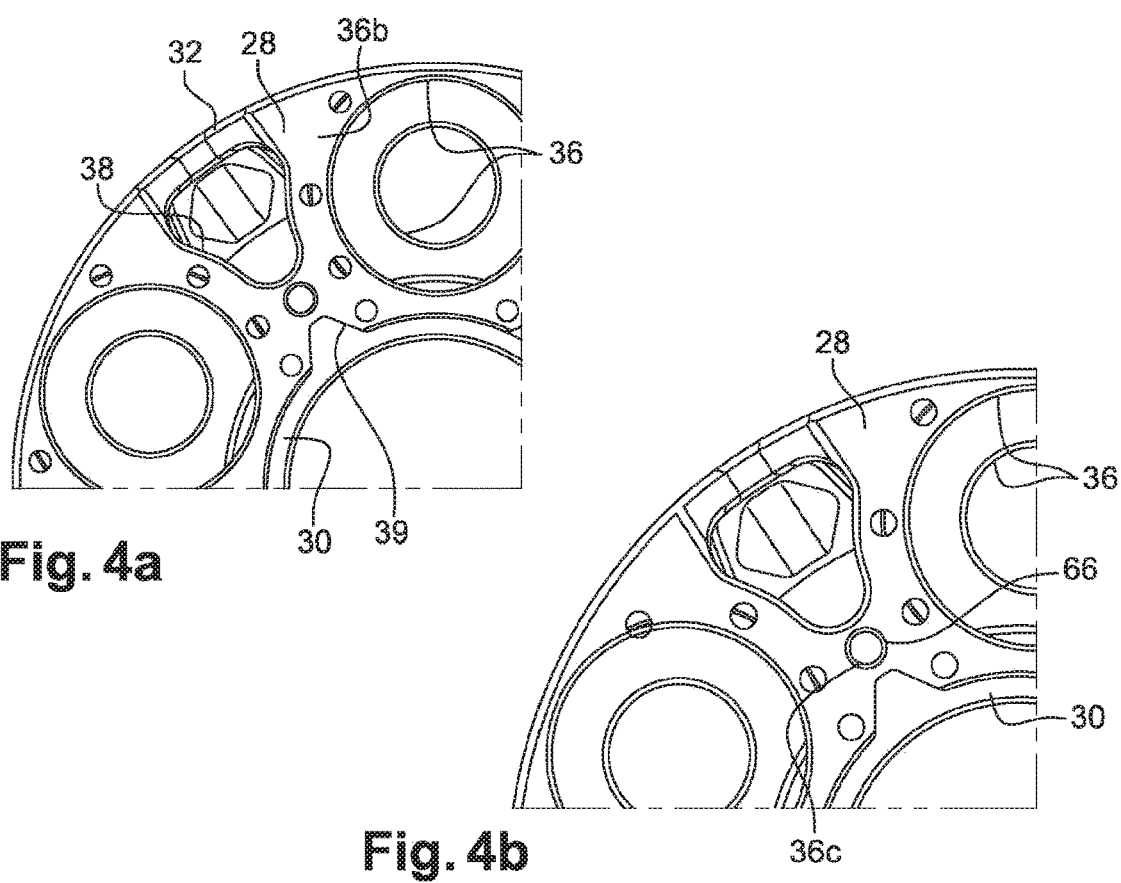
Fig. 4a
Fig. 4b

PLANET CARRIER FOR AN EPICYCLIC SPEED REDUCTION GEAR

The prior art comprises documents EP-A1-2 677 209, EP-A1-1 186 804, US-A1-2005/192152 and CN-U-201 747 802.

TECHNICAL FIELD

This invention concerns a planet carrier for an epicyclic reduction gear, in particular for an aircraft turbomachine.

BACKGROUND

The purpose of a mechanical reduction gear is to change the speed ratio and/or the torque between the input axis and the output axis of a mechanism.

Typically, double-flow turbomachines, particularly those with a high bypass ratio, have a mechanical epicyclic reduction gear 10 (see FIG. 1) to drive the shaft 12 of a fan (not shown). The purpose of the epicyclic reduction gear 10 is usually to transform the so-called fast rotational speed of the shaft of a power turbine 14 into a slower rotational speed for the shaft 12 driving the fan.

In a conventional manner, an epicyclic reduction gear 10 comprises (with respect to the longitudinal axis A of the turbomachine around which particularly the shaft of the power turbine 14 rotates)
- a sun pinion 16 in the form of a gear wheel which is assembled with the turbine shaft 14, for example with a splined connection. This sun pinion 16 rotates in one direction of rotation while driving the reduction gear 10,
- a planet carrier 18 carrying planet gears 20 via bearings so as to rotate about axes Y parallel to the longitudinal axis A, the planet gears 20 being formed by gear wheels meshing around the sun pinion 16, and the planet carrier 18 being attachable to a stator via bearings or rolling bearings. In addition, the planet carrier rotates about the axis A,
- an outer ring gear 22, which meshes with the planet gears 20 and which can be held stationary with respect to the structure of the turbomachine (a stator).

In particular, the planet carrier 18 is one of the central parts of reduction gear 10, supporting the bearing axes and the planet gears 20. Its function is to particularly ensure good support conditions for the planet gears 20 of the epicyclic reduction gear 10, and to rotate them around the axis A. One of the major requirements for a planet carrier 18 is to keep the planet gears 20 aligned, despite the deformation of the heavily loaded planet carrier 18, and also to ensure that they do not break under ultimate load. A misalignment of the planet gears 20 can particularly lead to premature wear of the gears and the speed reduction gear 10.

The planet carrier 18 is classically made of steel, titanium or other massive metal alloy and is therefore heavy. There are several aspects of the planet carrier that can be improved, such as the misalignment of the bearing axes of the planet gears, the stress resistance, the mass, the manufacturing complexity, etc. The misalignment criterion is considered to be the most important as it affects the reliability, service life and efficiency of the reduction gear.

Thus, the objective of this patent application is to propose a planet carrier capable of supporting the applied loads while keeping the planet gears aligned and remaining as light as possible.

In the document FR-A1-3 011 901, the applicant has proposed a reduction gear planet carrier 5 with a cage 7, the flanks 9, 10 of which are connected by straight bridges 16, i.e. aligned with the longitudinal axis A of the reduction gear. The flank 9 on the side of the torque output member 8 can be shaped to reduce the misalignment occurring at the level of the axes of the planet gears. However, the construction of this architecture is complex due to the fact that the recesses are not easily accessible and are very deep.

A solution to improve this situation would be to use a planet carrier with the flanks of the cage connected by bridges formed by bars crossing one another. This would facilitate the manufacture of the planet carrier and make it lighter, but would not sufficiently reduce the misalignment of the axes of the planet gears.

The invention therefore provides a solution to this problem.

DISCLOSURE OF THE INVENTION

To this end, the invention provides a planet carrier for an epicyclic speed reduction gear, comprising a torque transmission member having a longitudinal axis A and an annular cage extending around the axis A and connected to a longitudinal end of the member, said cage comprising two flanks extending substantially radially with respect to the axis A and connected by bridges, seats extending axially between the flanks and being intended for supporting planet gears mounted rotatably around the seats, characterized in that said bridges comprise bars which cross one another substantially in the shape of X and of which the ends located on the side of said member are connected to said member by a ring extending around said axis A and comprising a continuous annular channel which opens radially inwards with respect to said axis A.

The invention represents a compromise between the prior technologies and makes it possible to benefit from their advantages without their disadvantages. The bridges in the shape of an X allow better accessibility for the manufacture and maintenance of the planet carrier. Indeed, as the architecture of the cage is more open with respect to the planet carriers of the prior art, this allows, for example, milling operations to be carried out from outside the cage and facilitates endoscopic control.

The stresses in the part and the misalignment of the planet gears with respect to the axis A are further reduced by the continuous annular channel of the cage, which "isolates" the cage from the transmission member and thus limits the transmission of stresses from one to the other, particularly with respect to the passage of the torque, and allows the cage to be rotationally symmetrical in order to reduce its sensitivity to centrifugal forces. This symmetry makes it possible to reduce misalignment of the bearing axes of the planet gears in the presence of a centrifugal field. These features make it possible to give the planet carrier balanced rigidity.

The planet carrier according to the invention may comprise one or more of the following characteristics, taken in isolation from one another or in combination with one another:
- each bridge comprises at least two bars crossing one another,
- the two bars of each bridge cross one another in a zone close to one of the flanks or advantageously midway between the flanks; this position reduces the stresses in the bridges,
- said ring is substantially U-shaped in axial half-section and comprises two substantially coaxial and parallel annular walls connected at their outer periphery by an substantially cylindrical wall; this U-shaped defines said groove; this so-called "balanced rigidity" shape makes it possible to reduce misalignment as seen by the axes of the planet gears, a first of said annular walls forms one of said flanks and the other of said annular walls is connected to said member; the flanks of the cage are thus isolated from the transmission member of the reduction gear, said cylindrical wall comprises an annular row of through orifices; these orifices allow the oil to be discharged and prevent the formation of an unbalance because of oil trapped by centrifugation due to the rotation of the planet carrier, said cylindrical wall comprises a annular balancing bead which is protrudingly formed on its outer cylindrical surface; this is advantageous for facilitating the correction of the unbalance of the planet carrier by machining of this bead, said outer cylindrical surface is the outer cylindrical surface with the largest diameter of said cylindrical wall; this allows unbalance to be corrected with as little material removal as possible, said ring has an inner diameter substantially equal to an inner diameter of an inner bore of said member, or said annular walls have an inner diameter substantially equal to the inner diameter of said bore, said ring has an outer diameter substantially equal to a maximum outer diameter of said bridges, each of said bridges defines between its bars two triangular or trapezoidal spaces arranged head-to-tail with respect to each other, a first of said spaces being situated on the side of said ring and comprising a base defined by said ring, and a second of said spaces being situated on the opposite side and comprising a base open axially towards that side, said second space communicates with a first notch provided on the outer periphery of the flank opposite to said member, said first notch having a general shape of a V, the tip of which is oriented radially towards the axis and oriented towards the tip of a second notch substantially in the shape of a V arranged in a head-to-tail manner on the inner periphery of the same flank, the radial thickness of the bridges varies axially and is maximum at the level of their connection to said flanks.

The invention also relates to an epicyclic speed reduction gear comprising a planet carrier as mentioned above. The invention also relates to a turbomachine, in particular an aircraft, comprising an epicyclic reduction gear as mentioned above.

BRIEF DESCRIPTION OF THE FIGURES

Other features and advantages of the invention will appear when reading the detailed description of examples of the invention below, with reference to the annexed figures which represent, respectively:

FIG. 3 is a partial schematic view in axial cross-sectional of the planet carrier in FIG. 2, and shows dimensions, FIGS. 4a and 4b are partial front schematic views of one flank of the cage of the planet carrier of FIG. 2, FIGS. 5a to 5c are schematic side views of the cage of the planet carrier in FIG. 2, and show other dimensions.

DETAILED DESCRIPTION OF AN EMBODIMENT

Figure 1:
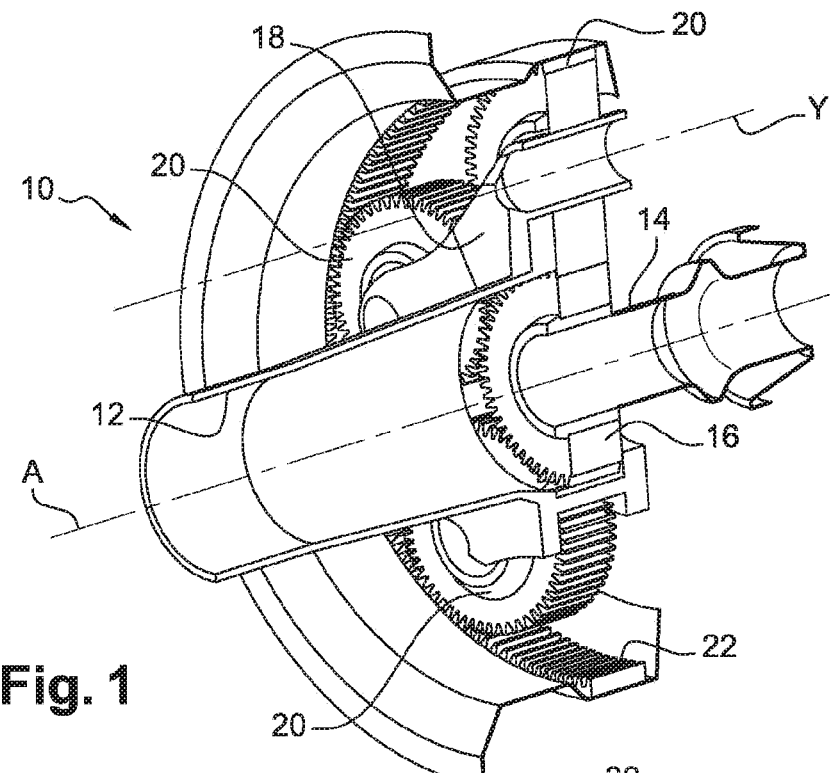
FIG. 1 is a schematic perspective and cross-sectional view of a conventional epicyclic reduction gear.

As mentioned above, FIG. 1 illustrates the general structure of an epicyclic speed reduction gear 10. During the operation of the epicyclic reduction gear 10, the torque transmitted through the reduction gear 10 is high, which can cause a deformation of the planet carrier 18 and lead to a misalignment of the axes of the planet gears 20. In addition, the centrifugal forces can also cause a deformation of the planet carrier 20, which can again lead to a misalignment of the planet gears 20. As mentioned above, it is essential that the planet carrier 18 maintains the correct positioning of the planet gears 20, despite the deformations suffered by the planet carrier 18 during operation.

Figure 2:
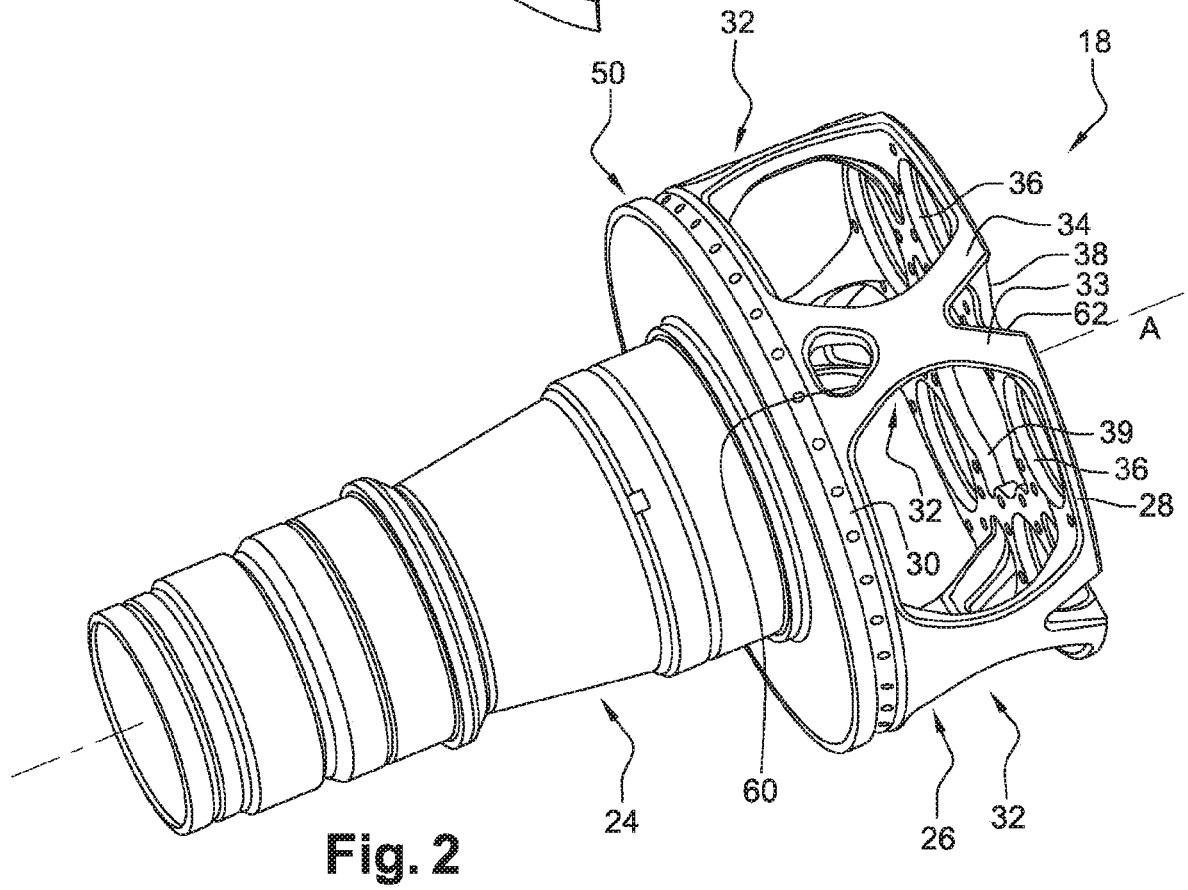
FIG. 2 is a schematic perspective view of a planet carrier according to the invention.

As can be seen in FIG. 2, the planet carrier 18 according to the invention extends along the axis A and comprises two parts: a torque transmission member 24 with a longitudinal axis A and an annular cage 26 extending around the axis A. The annular cage 26 is connected to one longitudinal end of the member 24. The member 24 is tubular and extends axially (along the axis A). It has a generally cylindrical or frustoconical shape, one longitudinal end of which is extended by an annular connecting part and is intended to form the connection with the turbine shaft 14 (see FIG. 1). Thus, the front longitudinal end of the member 24 is connected to the cage 26 and the rear end, which has teeth, is intended to be engaged with the turbine shaft 14.

The front is defined as being on the side of the fan and the rear is defined as being on the side of the exhaust nozzle of the turbomachine.

The annular cage 26 comprises two flanks 28, 30 extending substantially radially with respect to the axis A, a front flank 28 and a rear flank 30 respectively. The front flank 28 is defined as the flank located on the opposite side of the transmission member 24 and the rear flank 30 is defined as that integral with the member 24. The two flanks 28, 30 are connected to each other by bridges 32. As shown in FIG. 2 and following, each bridge 32 comprises two arms or bars 33, 34 crossing one another and thus has a general shape of an X. Each bar 33, 34 is thus cut into two corresponding parts 33a, 33b, 34a, 34b substantially aligned and extending on either side of the crossing (or zone of crossing) of the X. In the example shown, the two corresponding bars 33, 34 of each bridge 32 cross one another in a zone close to one of the flanks 28, 30, or advantageously at mid-distance from the flanks.

Depending on the embodiment shown, the flanks 28, 30 and the bridges 32 are made in one part. This allows the planet carrier 18 to form one structural unit, thus eliminating the problems associated with the assembly of several parts by means of additional connecting members. This allows to particularly avoid problems related to an unbalance caused by assembly tolerances, assembly problems or additional mass due to the multiplication of the parts.

As shown in FIGS. 4a and 4b particularly, the front flank 28 and rear flank 30 each have holes for mounting one end of an axle of a planet gear 20 (FIG. 1) and thus form seats 36 for the planet gears 20. These seats 36 thus extend axially (along the axis A) between the flanks 28, 30 and are intended to support the planet gears 20 mounted rotatably around the seats 36.

As can be seen in FIGS. 2 and 4a, 4b, at least one of the flanks 28, 30, in this case the front flank 28 comprises, between two adjacent seats 36, at least one or two notches 38, 39. In the example shown, the notches are aligned with a bridge 32 in a plane passing through the axis A but, alternatively, they could be arranged differently. Each notch 38 is located at the outer periphery of the flank 28, between the corresponding bars 33, 34 of each bridge 32, and is generally in the shape of an U or V, the opening of which is facing radially outward from with respect to the axis A. Each notch 39 is located at the inner periphery of the flank 28 and is generally in the shape of an U or V. These notches 38, 39 are arranged in head to tail with respect to each other so that their tips or bottoms face each other.

In a manner known per se, during the operation of the epicyclic reduction gear 10, a first force path passes through the rear flank 30 (starting from the corresponding ends of the seats 36 of the planet gears 20) and then through the torque transmission member 24. A second force path passes through the front flank 28 (from the corresponding ends of the seats 36 of the planet gears 24 to the connecting zones between the front flank 28 and the bridges 32), the bridges 32 and then the torque transmission member 24.

The cage 26 which supports the axes of the bearings (along the axes Y) and therefore the planet gears 20 is thus shaped with the bars 33, 34 crossing one another to obtain "mesh" or "lattices". This allows the forces necessary for the operation of the epicyclic reduction gear 10 to be transmitted with a minimum of material. This invention therefore presents a solution which optimises the mass of reduction gear 10 without hindering the passage of forces between the flanks 28, 30 and by limiting the misalignment of the planet gears 20.

This optimization is obtained particularly by the particular inclination of bars 33, 34 of the bridges 32. In fact, the bars 33, 34 of the bridges 32 are each cut in two parts: a rear part (close to the rear flank 30) and a front part (close to the front flank 28). The rear parts 33b, 34b and front parts 33a, 34a of each bar 33, 34 meet at the crossing of the X formed by each bridge 32. The peculiarity of the invention is that, as well as the corresponding bars 33, 34 between them, the rear parts 33b, 34b and front parts 33a, 34a of each bar 33, 34 of each bridge 32 do not extend in the same plane and form an angle different from 0 between them. Thus, each bridge 32 comprises bars 33, 34 which are each inclined with respect to a longitudinal plane passing through the axis A and substantially through the corresponding bar 33, 34. This difference in inclination of the bars 33, 34 between them and of the different parts 33a, 34a, 33b, 34b between them makes it possible to stiffen the planet carrier 26 in torsion around the axis A during the operation of the turbomachine, and thus to limit the misalignments of the planet gear axes with respect to the axis A, when forces due to the torsion pass through the planet carrier.

According to another feature of the invention, the bridges 32 are connected to the member by a ring 50 extending around the axis A and comprising a continuous internal annular channel 52 visible in FIG. 3.

In the example shown, the ring 50 is substantially in the shape of an U in axial half-section and comprises two substantially coaxial and parallel annular walls 50a, 50b connected at their outer periphery by an substantially cylindrical wall 50c.

The front wall 50a forms one of the flanks, i.e. the rear flank, and the rear wall 50b is connected to the member 24.

The wall 50c comprises of an annular row of radially extending through orifices 53. The purpose of these orifices is to allow the discharge of oil and to prevent oil pockets from being trapped by centrifugation, which could, among other things, cause unbalance.

In addition, the wall 50c comprises an annular balancing bead 54 protruding from its outer cylindrical surface. This bead is advantageously designed so that its geometry can be modified by machining in order to correct any unbalance in the planet carrier. If the planet carrier is designed by machining a block of material, the bead would be formed in situ and would be machined subsequently according to an unbalance found and corrected. The position of the bead on the largest diameter of the planet carrier allows the unbalance to be corrected with a minimum amount of material removal. Here the bead is positioned on the rear flank 30 but it could be positioned on the front flank 28.

The ring 50 has an inner diameter D1 which is approximately equal to an inner diameter D2 of an inner bore 56 of member 24. In other words, the annular walls 50a, 50b have an inner diameter substantially equal to the inner diameter of the bore 56.

The ring 50 also has an outer diameter D3 which is substantially equal to the maximum outer diameter D4 of the bridges.

Each bridge 32 defines between its bars 33, 34 two triangular or trapezoidal spaces 60, 62 arranged in head to tail with respect to each other. The corners of these spaces may be concavely rounded. A first space 60 is located on the side of the ring 50 and comprises a base defined by the ring 50, and thus oriented backwards. A second space 62 is located on the opposite side and has a base open axially towards that side. The space 62 communicates with the above-mentioned notch 38, as can be seen in FIGS. 2 and 4a, 4b.

The radial thickness E of the bridges 32 varies axially and is maximum (E') at their connection to the flanks 28, 30.

FIGS. 4a to 7b illustrate several optimized dimensional parameters for a particular embodiment of the invention.

FIG. 4a shows that the seats 36 of the flank 28 have a larger diameter than the seats of the flank 30. The seats 36 of the flank 30 are visible through those on the flank 28 in FIGS. 4a and 4b. The flank 28 has an annular cover at each seat that is not shown. The seats 36 are surrounded by annular portions 36b, the thickness of which is determined to provide flexibility in this zone. These portions 36b are bordered by the notches 38, 39 and comprise screw mounting orifices for holding the covers.

FIG. 4b shows that the portions 36b of the flank are joined together by strips of material 36c extending between the notches 38, 39, and more specifically between the tips or bottoms of these notches. These strips 36c may also comprise a thinner and more flexible zone formed, for example, by a blind hole 66 of predetermined diameter, made on the front face of the flank.

Figure 6A:
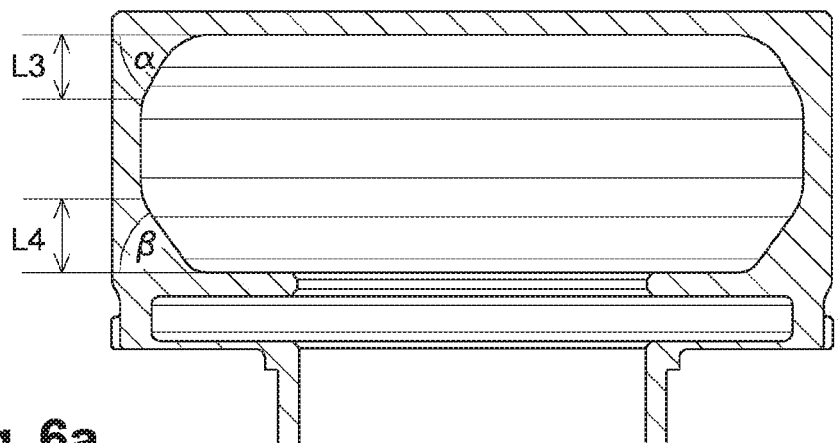
FIGS. 6a and 6b are schematic cross-sectional views of the planet carrier obtained after turning and before machining, in particular for the production of the bridges, and show other dimensions.
Figure 6B:
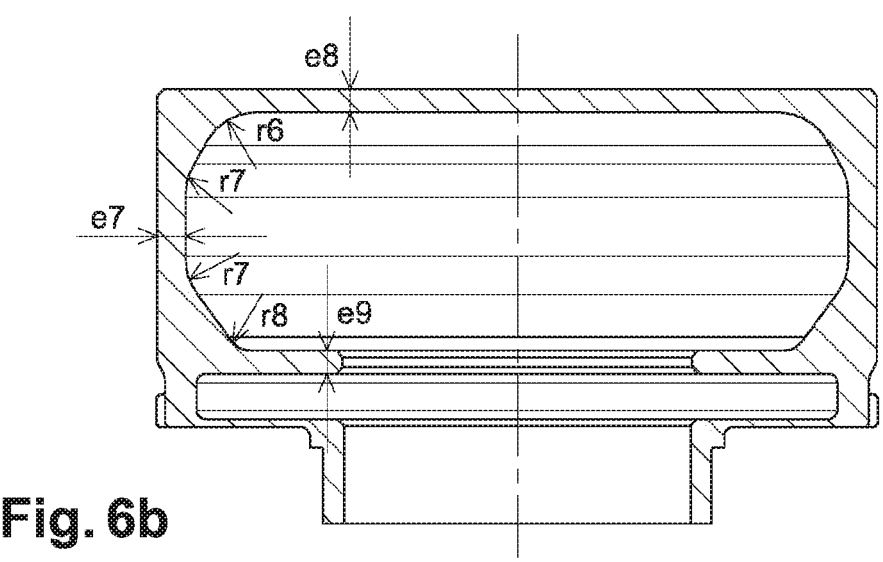
Figure 7A:
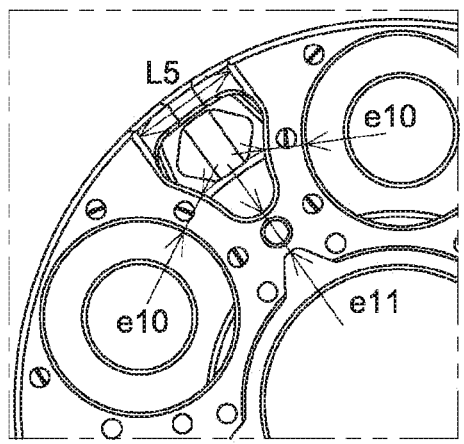
FIGS. 7a and 7b are similar views to FIGS. 3 and 4, and show other dimensions.
Figure 7B:
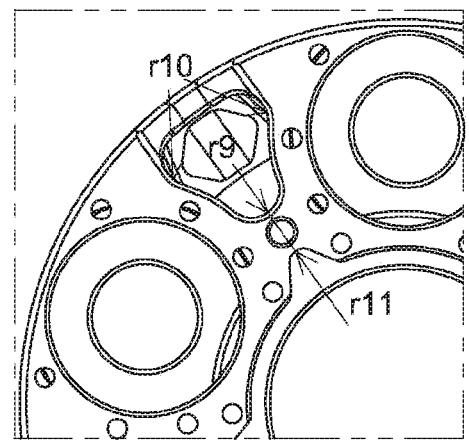

FIGS. 6a and 6b are schematic cross-sectional views of the planet carrier obtained after turning and before machining, especially for the manufacture of bridges. These figures show the thickness of the part in several areas as well as the connection angles and radii of portions of the bridges.

Optimized parameters comprise, for example, lengths or distances L, thicknesses e, radii r, angles $\alpha$, $\beta$, $\gamma$, etc.

Figure 5A:
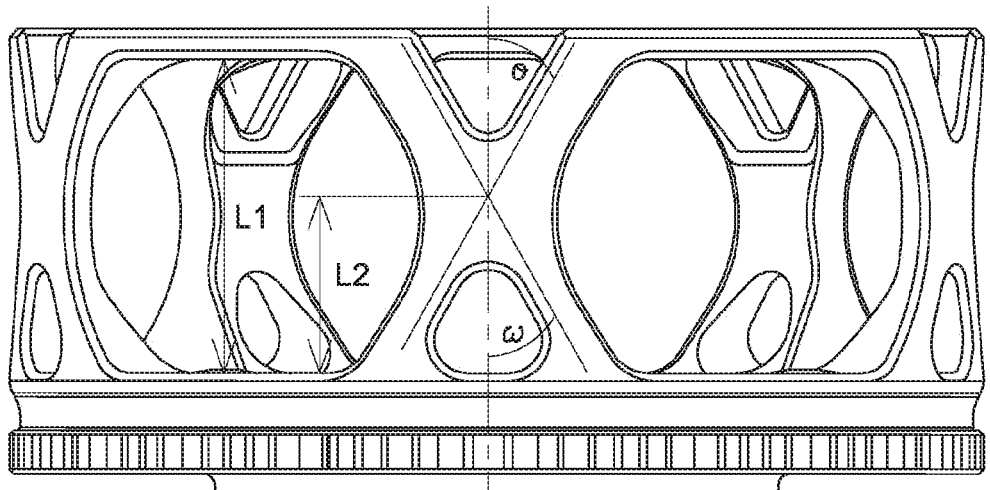

Referring to FIG. 5a: $5°<\omega<80°$; $5°<\theta<80°$; and $1<L_1/L_2<20$.

Figure 5B:
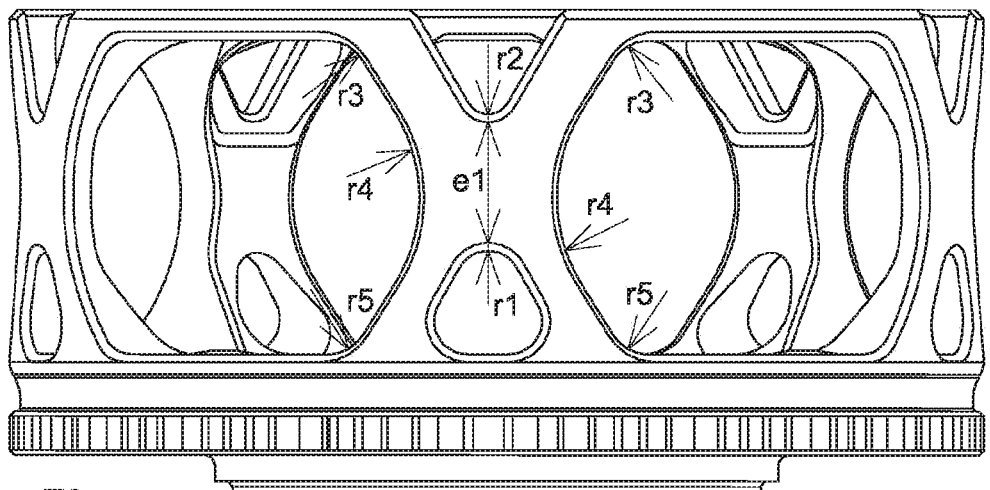

Referring to FIG. 5b: 1 mm<$r_1$<50 mm; 1 mm<$r_2$<50 mm; 1 mm<$r_3$<50 mm; 1 mm<$r_4$<80 mm; and 1 mm<$r_5$<50 mm.

With reference to FIGS. 5a and 5b: 1<$L_1/e_1$<30.

Figure 5C:
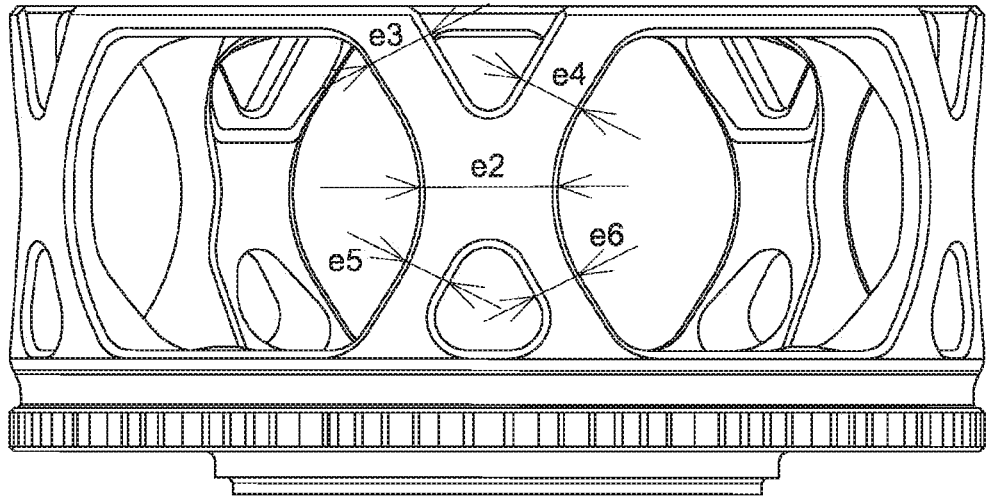

Referring to FIGS. 5b and 5c: 0.05<$e_2/e_1$<20.

Referring to FIG. 5c: 0.1<$e_2/e_3$<30; 0.1<$e_2/e_4$<30; 0.1<$e_2/e_5$<30; and 0.1<$e_2/e_6$<30.

With reference to FIGS. 5a and 6a: 1<$L_1/L_3$<30 and 1<$L_1/L_4$<30.

With reference to FIG. 6a: 5°<$\alpha$<90° and 5°<$\beta$<90°.

Referring to FIG. 6b: 1 mm<$r_6$<50 mm; 1 mm<$r_7$<50 mm; 1 mm<$r_8$<50 mm; 1 mm<$r_9$<50 mm; 1 mm<$r_{10}$<50 mm; and 1 mm<$r_{11}$<50 mm.

With reference to FIGS. 5b, 5c, 6b and 7a: 0.1<$e_2/e_7$<30; 0.1<$e_1/e_8$<30; 0.1<$e_1/e_9$<30; 0.02<$e_{10}/e_8$<50; 0.02<$e_{11}/e_8$<50; and 0.02<$L_5/e_2$<50.

The invention claimed is:

1. A planet carrier for an epicyclic speed reduction gear, the planet carrier comprising:
   a torque transmission member having a longitudinal axis A, and
   an annular cage extending around the longitudinal axis A and connected to a longitudinal end of the torque transmission member,
   said annular cage comprising two flanks extending essentially radially with respect to the longitudinal axis A, said two flanks are connected by bridges,
   said annular cage comprising seats extending axially between the two flanks and being intended for supporting planet gears mounted rotatably around the seats,
   wherein said bridges comprise bars which cross one another substantially in the shape of X, each of said bars comprise an end connected to said torque transmission member by a ring, and
   wherein said ring extending around said longitudinal axis A and comprising a continuous annular channel opening radially inwardly with respect to said longitudinal axis A.

2. The planet carrier according to claim 1, wherein said ring is substantially U-shaped in axial half-section and comprises two substantially coaxial and parallel annular walls connected at their outer periphery by a substantially cylindrical wall.

3. The planet carrier according to claim 2, wherein a first of said annular walls forms one of said flanks and the other of said annular walls is connected to said torque transmission member.

4. The planet carrier according to claim 2, wherein said substantially cylindrical wall comprises an annular row of through orifices.

5. The planet carrier according to claim 2, wherein said substantially cylindrical wall comprises an annular balancing bead which is protrudingly formed on its outer cylindrical surface.

6. The planet carrier according to claim 5, wherein said outer cylindrical surface is the outer cylindrical surface with the largest diameter of said cylindrical wall.

7. The planet carrier according to claim 2, wherein annular walls have an inner diameter substantially equal to an inner diameter of an inner bore of said torque transmission member.

8. The planet carrier according to claim 1, wherein said ring has an inner diameter substantially equal to an inner diameter of an inner bore of said torque transmission member.

9. The planet carrier according to claim 1, wherein each of said bridges defines between its bars two triangular or trapezoidal spaces arranged head-to-tail with respect to each other, a first of said spaces being situated on the side of said ring and comprising a base defined by said ring, and a second of said spaces being situated on the opposite side and comprising a base open axially towards this side.

10. The planet carrier according to claim 9, wherein said second space communicates with a first notch provided on the outer periphery of the flank opposite to said torque transmission member, this first notch having a general shape of a V, the tip of which is oriented radially towards the axis and oriented towards the tip of a second notch substantially in the shape of a V arranged in a head-to-tail manner on the inner periphery of the same flank.

11. The planet carrier according to claim 1, wherein each bridge comprises at least two bars crossing one another.

12. The planet carrier according to claim 11, wherein the two bars of each bridge cross one another in a zone close to one of the two flanks.

13. The planet carrier according to claim 11, wherein the two bars of each bridge cross one another in midway between the two flanks.

14. The planet carrier according to claim 1, wherein the ring has an outer diameter equal to a maximum outer diameter of said bridges.

15. The planet carrier according to claim 1, wherein a radial thickness of the bridges varies axially and is maximum at the level of the connection of said bridges to said two flanks.

16. An epicyclic speed reduction gear comprising a planet carrier, said planet carrier comprising a torque transmission member having a longitudinal axis A and an annular cage extending around the longitudinal axis A and connected to a longitudinal end of the torque transmission member,
   said annular cage comprising two flanks extending essentially radially with respect to the longitudinal axis A and connected by bridges,
   said annular cage comprising seats extending axially between the two flanks and being intended for supporting planet gears mounted rotatably around the seats,
   wherein said bridges comprise bars which cross one another substantially in the shape of X, each of said bars comprise an end connected to said torque transmission member by a ring, and
   wherein said ring extending around said longitudinal axis A and comprising a continuous annular channel opening radially inwardly with respect to said longitudinal axis A.

17. A turbomachine, comprising an epicyclic reduction gear according to claim 16.

18. A planet carrier for an epicyclic speed reduction gear, comprising a torque transmission member having a longitudinal axis A and an annular cage extending around the axis A and connected to a longitudinal end of the torque transmission member, said annular cage comprising two flanks extending essentially radially with respect to the axis A and connected by bridges, seats extending axially between the flanks and being intended for supporting planet gears mounted rotatably around the seats,
   wherein said bridges comprise bars which cross one another substantially in the shape of X and of which the ends located on the side of said torque transmission member are connected to said torque transmission member by a ring extending around said axis A and comprising a continuous annular channel opening radially inwardly with respect to said axis A,
   wherein said ring is substantially U-shaped in axial half-section and comprises two substantially coaxial and parallel annular walls connected at their outer periphery by a substantially cylindrical wall.

19. A planet carrier for an epicyclic speed reduction gear, comprising a torque transmission member having a longitudinal axis A and an annular cage extending around the axis A and connected to a longitudinal end of the torque transmission member, said annular cage comprising two flanks extending essentially radially with respect to the axis A and connected by bridges, seats extending axially between the flanks and being intended for supporting planet gears mounted rotatably around the seats, wherein said bridges comprise bars which cross one another substantially in the shape of X and of which the ends located on the side of said torque transmission member are connected to said torque transmission member by a ring extending around said axis A and comprising a continuous annular channel opening radially inwardly with respect to said axis A, wherein said ring has an inner diameter substantially equal to an inner diameter of an inner bore of said torque transmission member.

20. A planet carrier for an epicyclic speed reduction gear, comprising a torque transmission member having a longitudinal axis A and an annular cage extending around the axis A and connected to a longitudinal end of the torque transmission member, said annular cage comprising two flanks extending essentially radially with respect to the axis A and connected by bridges, seats extending axially between the flanks and being intended for supporting planet gears mounted rotatably around the seats, wherein said bridges comprise bars which cross one another substantially in the shape of X and of which the ends located on the side of said torque transmission member are connected to said torque transmission member by a ring extending around said axis A and comprising a continuous annular channel opening radially inwardly with respect to said axis A, wherein each of said bridges defines between its bars two triangular or trapezoidal spaces arranged head-to-tail with respect to each other, a first of said spaces being situated on the side of said ring and comprising a base defined by said ring, and a second of said spaces being situated on the opposite side and comprising a base open axially towards this side.

\* \* \* \* \*